April 3, 1934.   L. E. ZERBE   1,953,094
CROWN HOIST
Filed Jan. 23, 1928   3 Sheets-Sheet 1

Inventor
LEWIS E. ZERBE
Attorneys.

April 3, 1934. L. E. ZERBE 1,953,094
CROWN HOIST
Filed Jan. 23, 1928 3 Sheets-Sheet 2

Inventor
LEWIS E. ZERBE
by Hazard and Miller
Attorneys.

April 3, 1934.  L. E. ZERBE  1,953,094
CROWN HOIST
Filed Jan. 23, 1928   3 Sheets-Sheet 3

Inventor
LEWIS E. ZERBE
by Hazard and Miller
Attorneys

Patented Apr. 3, 1934

1,953,094

UNITED STATES PATENT OFFICE 1,953,094

CROWN HOIST

Lewis E. Zerbe, Moneta, Calif.

Application January 23, 1928, Serial No. 248,912

35 Claims. (Cl. 255—19)

My invention is a crown hoist for use on a derrick in deep well drilling, such as in lowering and raising the drill pipe controlling a rotary drill and installing the casing.

An object of my invention is a crown hoist to be located on a derrick for deep well drilling, in which a hydraulic engine forms an essential feature of the hoist, this engine having pistons reciprocating in cylinders, and by means of a connecting rod and crank operating the crank shaft. Such crank shaft has sprocket gears thereon over which take heavy sprocket chains, such chains being used to lower and raise the various equipment used in well drilling.

Another object of my invention is in a hydraulic crown hoist, such as above mentioned, to control the flow of the hydraulic fluid so that drill pipe and the like may be lowered at the desired rate, giving a quick run for each length of pipe, with a quick stoppage for connecting the stands; and also the same construction being utilized for lowering or raising well casing. The arrangement may also be used for raising, giving a quick action on the lift, with quick stops for disconnecting the various stands. In this control of the hydraulic engine I use a hook-up of control valves, preferably operated by a single lever so that these valves act in unison, and I preferably utilize hydraulic pumps with high and low pressure accumulators, in order to have a low pressure when a comparatively light weight is to be handled and a high pressure when a comparatively heavy weight is to be handled.

A further important object of my invention is by a hydraulic crown hoist to control the rate of the lowering or downward motion of a rotary drill, so that such drill may be fed at substantially the maximum speed through any kind of material, without danger of twisting the drill pipe or connections; that is, the rate of downward feed of the rotary drill is governed by the resistance to the cutting of the bit, so that, if desired, a maximum working torque may always be maintained on the drill pipe and connections, whereby in hard material the feed may be at a slow rate and in softer material at a higher rate, with suitable intermediate speeds, depending on the character of the formation through which the drilling is carried.

In the control of the drill feed in accordance with the torque, a more detailed object of my invention is to have this automatic, so that the flow of the hydraulic fluid through the hydraulically operated crown hoist is governed by the torque which it is safe to use on the drill pipe and equipment connected thereto. In this connection I preferably use by-passes on the hydraulic fluid supply pipes, such by-passes having one or more needle valves and one or more of such valves is controlled by a suitable electric or other device governed by the amount of power required to rotate the rotary drill so that as the power required increases, the needle valve may be closed, thus restricting the rate of downward feed and therefore maintaining the safe working torque.

A further object of my invention is in the particular construction of the crown hoist hydraulic engine and the action of the valves to control a direct and reverse movement thereof; and in this connection I preferably utilize valves of the poppet type controlled by a cam shaft driven from the crank shaft. This cam shaft is connected to a differential mechanism and by means of a cable leading to the derrick floor or to the driller's station, this differential may be controlled to position the cam shaft for what may be termed a downward feed, or an upward lift, that is, causing the reversal of the hydraulic engine.

Another detailed object and feature of my invention is in providing the crank shaft with a plurality of parallel sprockets over which take an equal number of suitable sprocket chains, these chains leading down centrally of the derrick over the hole to be drilled and having their free ends travel down the derrick, the free ends of the chains preferably having a weight and being guided into a suitable compartment. On the crank shaft I utilize small sprocket wheels permanently connected thereto, these being particularly adapted for use with heavy work; and for use with comparatively light work and work requiring quick action I have attachable and detachable large sprockets fitting over the small gears. The sprocket chains in the transfer are suspended and relocated from the small to the large gears, or vice versa.

My invention in its various aspects will be more readily understood from the following description and drawings, in which.

Figures 1, 3, 8, 14:
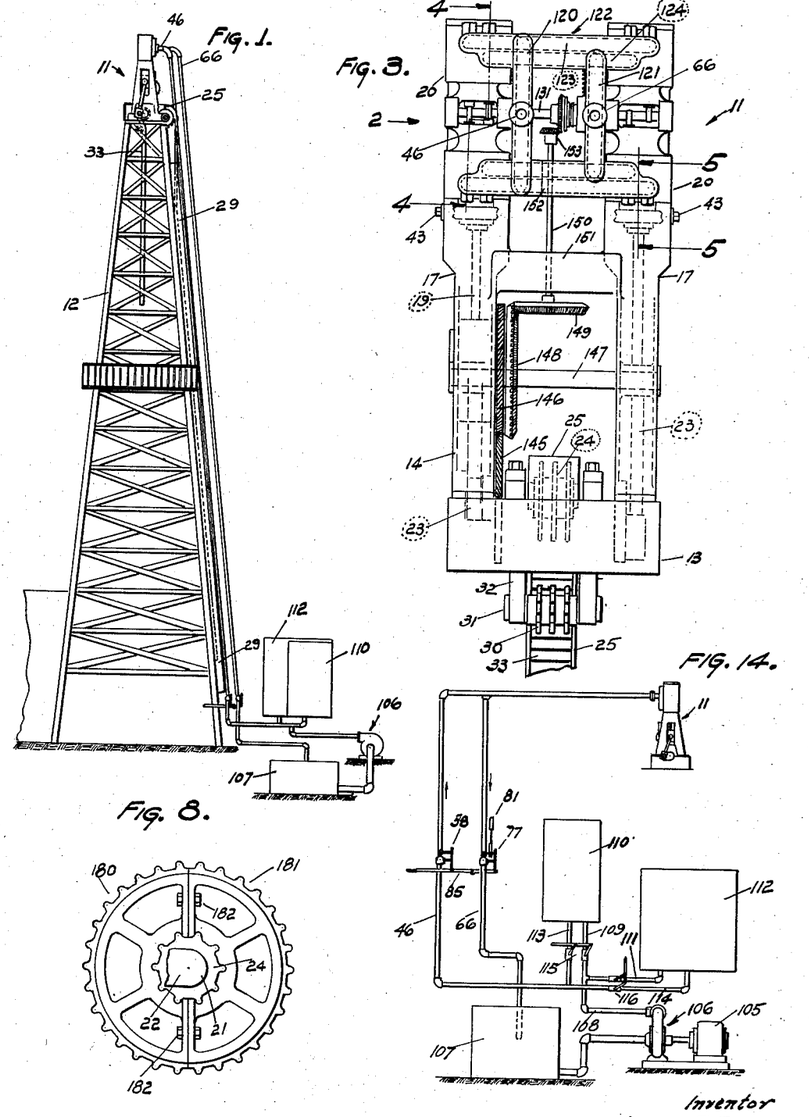
Figure 1 is a side elevation of a derrick with my crown hoist and the equipment therefor connected to the derrick.
Fig. 3 is a front elevation taken in the direction of the arrow 3 of Fig. 2.
Fig. 8 is a side elevation of the attachable and detachable large sprocket gears.
Fig. 14 is a diagrammatic layout of the piping, the hydraulic accumulators and the valve control.

The crown hoist, designated generally by the numeral 11, is mounted on a derrick 12, being hoisted and centered in any suitable manner and preferably being placed in position as a complete unit. This hoist embodies a base 13 with side stanchions 14 having guideways 17 therein in which reciprocate cross-heads 18. Each cross-head is connected to a piston rod 19, such rods operating in the cylinders 20. At the base there is journaled a suitable crank shaft 21 with cranks 22, such cranks being connected by connecting rods 23 with the cross-heads.

The crank shaft is provided with a plurality of sprockets 24 rigidly connected thereto, these being illustrated as three in number, and over these sprockets take sprocket chains 25, there being idler sprocket pulleys 26 on a shaft 27 journaled in lateral brackets 28. These position the chains so that they may drop downwardly into a chute 29 extending downwardly along the side of the derrick. A second group of idler pulleys 30 are mounted on a shaft 31 in a frame 32 extending downwardly from the base 13; these position the drop end 33 of the chains centrally in relation to a well being operated on. This drop end of the chain is provided with the usual swivel or lifting mechanism for connection to the various equipment used in drill work, such as the drill pipe, the casing, etc.

Figures 2, 4, 5, 6, 7, 12:
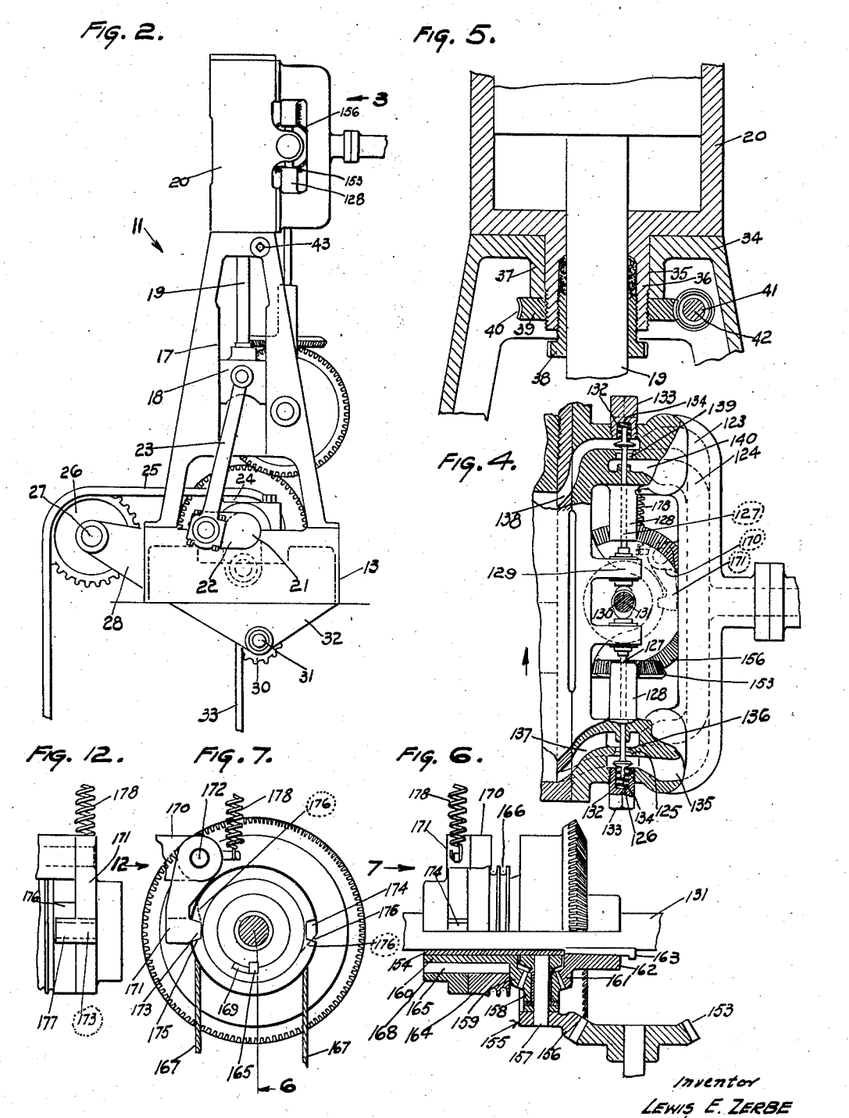
Fig. 2 is a side elevation of the hoist as if taken in the direction of the arrow 2 of Fig. 3.
Fig. 4 is a vertical detail section on the line 4—4 of Fig. 3 in the direction of the arrows.
Fig. 5 is a detail vertical section on the line 5—5 of Fig. 3 in the direction of the arrows.
Fig. 6 is an elevation partly in section of a cam actuating differential.
Fig. 7 is an end elevation of Fig. 6 in the direction of the arrow 7.
Fig. 12 is a detail view taken in the direction of the arrow 12 of Fig. 7.

In order to hold the cylinders 20 solid on the top 34 of the stanchions 14 I provide a central opening 35 through which extends downwardly a neck 36 of each of the cylinders, the stanchions having a downwardly extending sleeve 37. There is the usual packing and packing gland 38 forming a liquid-tight seal for the piston rods 19. A nut 39 has a worm gear 40 thereon and is threaded on the outside of the neck 36 of the cylinder, being engaged by a worm 41 mounted on a worm shaft 42, such being rotatable in any suitable manner as by attaching a crank to the end 43 of such worm shaft. Therefore, by this construction the cylinders may readily be maintained in a tight mounting on the stanchions and if any adjustment or repairs are necessary, they may be readily loosened and removed.

Figures 9, 10, 11, 13:
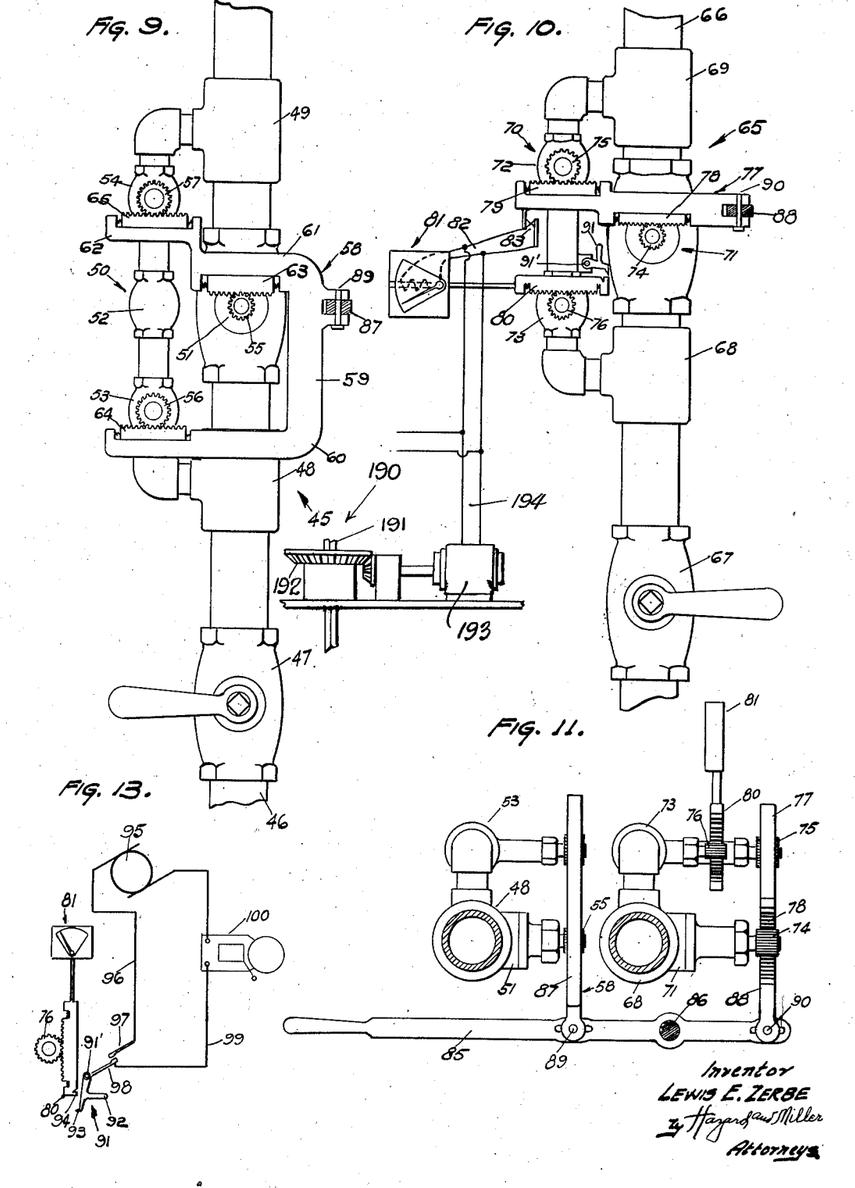
Fig. 9 is a plan of piping and valves leading to the hoist.
Fig. 10 is a plan of the piping and valves leading from the hoist, showing the automatic torque control.
Fig. 11 is a transverse section showing the main portions of the pipes and valves of Figs. 9 and 10 in an assembled position with a lever control.
Fig. 13 is a diagram of an electric circuit having a latch to hold the automatic valve closed and to give a signal.

The valves to control the flow of the hydraulic fluid to opposite ends of the cylinders are of the poppet type, being controlled by a cam shaft. The construction and mounting of the valves is illustrated in Figs. 3 and 4, and is described in detail hereunder. The control of the hydraulic fluid to and from the valves for actuating the engines is illustrated by the piping of Figs. 9, 10 and 11. In this construction the up-flow piping, designated by the numeral 45, is illustrated particularly in Fig. 9 and on the left hand side of Fig. 11. In this connection a pipe 46 leads from a suitable accumulator supplied by a pump and passes through a hand control valve 47, such being used principally when hoisting. There are couplings 48 and 49 on this pipe 46 with a by-pass 50 connected between such couplings and between the couplings there is a main control valve 51. The by-pass has a regulating valve 52 of a standard type, and a plurality of small control valves 53 and 54.

The valve 51 is provided with an operating gear 55 and the valves 53 and 54 with operating gears 56 and 57. A yoke 58 has an end section 59 with a pair of arms 60 and 61. The arm 61 has an off-set extension 62. The arm 61 is provided with a rack 63 meshing with the gear 55 of the main control valve 51, and the arm 60 has a rack 64 geared with the gear 56 of the by-pass valve 53, and the arm 62 has a rack 65 meshing with the gear 57 of the second by-pass valve 54. In the position illustrated in Fig. 9 these valves are shown in the drilling position, in which the valve 51 is closed and the valves 53 and 54 are open, the hoist being designed to gradually lower the drill pipe and the drill bit into the work, while such pipe and drill is being rotated by the usual mechanism.

It will be noticed by the link-up of the valves 51, 53 and 54 and their engagement with the racks that when the yoke 58 is moved to gradually open the valve 51, that on account of the reverse connection of the racks to the gears 56 and 57, these valves are gradually closed, and vice versa. Hence, there may be any desired proportion of flow of the hydraulic fluid through the main valve and the valves of the by-pass, and when desired, the main valve may be entirely closed, the by-passes full open, or the by-passes entirely closed and the main valve full open.

In Fig. 10 the pipe and controlling valves for the down or back flow of the fluid from the hoist is illustrated. In this figure this down coupling is designated generally by the numeral 65, having a down pipe 66. This down pipe has a manually controlled valve 67 therein corresponding to the valve 47 of the up-flow pipe. There are a pair of couplings 68 and 69 having a by-pass 70 connected thereto, and between such couplings there is a main valve 71. The by-pass is provided with two by-pass valves 72 and 73.

The main valve has an operating gear 74, the valve 72 a gear 75 and the valve 73 a gear 76. In this case there is a single rack bar 77 having a rack 78 on one side meshing with the gear 74 of the valve 71, and a rack 79 on the opposite side meshing with the gear 75 of the by-pass valve 72, on account of this reverse connection therefor. When the rack bar is operated, it may gradually open valve 71 and correspondingly gradually close the by-pass valve 72, or vice versa. In the position illustrated in Fig. 10, the arrangement is shown as in the drilling position.

A rack bar having a rack 80 meshes with the gear 76 of the by-pass valve 73. This rack bar is controlled by a regulating and recording instrument designated generally by the numeral 81, this being connected to an electric circuit 82 having a switch 83, one element of which is mounted to move with the rack bar 77, so that the circuit is in the closed circuit position for the drilling operation, when the valve 71 is closed.

The particular regulating and recording instrument is not detailed herein, as it forms no particular part of my invention and may be a standard type. However, this is designed to be coupled with the power drive for rotating the drill pipe and drill bit so that increases and decreases in the amount of power utilized cause a shifting of the rack 80 to decrease or increase the opening of the by-pass valve 73. By this construction when the instrument is properly calibrated, I may utilize a torque on the drill pipe which is about the maximum that this may stand with safety, and govern the speed of drilling accordingly; thus if the drilling is easy the speed of lowering the drill tools may be increased until the maximum torque is developed, and if the drilling is difficult, the speed of the lowering of the drill is decreased, this being automatically governed by the regulation of the by-pass valve 73.

The piping and valve system of Figs. 9 and 10 are linked to be operated in unison by means of a hand lever 85 mounted on a pivot 86. This has a connection to links 87 and 88 by pin and slot connections 89, and the link 87 is connected to the yoke 58, the link 88 being connected to the rack bar 77 by pin connections 90. Therefore, when the lever is operated, the valve systems of the up and down pipes are actuated in a reverse order and manner.

The automatic valve 73 is preferably a needle valve and, as above mentioned, it requires the valve 71 to be closed and the valve 72 to be open before the switch 83 is closed and the circuit is established through the standard electrical equipment 81. I have a safety connection for the drilling operation to lock the valve 73 closed when the torque becomes greater than that for which the instruments are set, and thereby the drilling operation is stopped, requiring the driller to manually release the mechanism and again start it. This construction is illustrated in Figs. 10 and 13 in which a pawl 91 is illustrated as being pivotally connected at 91' to a structure adjacent the by-pass pipe 70. This has an operating handle 92. The pawl has a tooth 93 which is adapted to engage in the notch 94 in the rack 80.

In Fig. 10 is illustrated diagrammatically a rotary ring designated generally by the numeral 190, in which the drill pipe 191 is rotated by the rotary table 192 driven through the medium of an electric motor 193. There is an electrical power connection 194, this having an auxiliary connection to the electric circuit 82, this circuit being connected to the regulating instrument 81.

There is an electric circuit having a source of power 95, a lead 96, a fixed contact 97, a movable contact 98 connected to the pawl 91, and a lead 99 having a signal, such as a bell 100 therein, and back to the source of power. When the rack 80 is moved by the automatic electrical control 81 so as to close the valve 73, the tooth 93 of the pawl 90 engages in the notch 94 closing the circuit between the fixed and movable contacts 97 and 98, and thus giving an audible signal by the bell 100. The pawl thus holds this valve shut and prevents operation of the hydraulic engines so that it is necessary for the driller to manually release the pawl and again start the drilling procedure.

A suitable system of piping and connections to the engine is substantially as follows, having reference particularly to Fig. 14: In this instance a pumping equipment is illustrated as having a motor 105 and a suitable pump 106, which is indicated as a rotary type. This pump is connected to a storage reservoir 107 and has a discharge 108. This discharge leads through a pipe 109 to a high pressure accumulator 110 and through a pipe 111 through a low presure accumulator 112. There is a discharge pipe 113 from the high pressure accumulator and a discharge pipe 114 from the low pressure. The sets of pipes to and from each of the accumulators is controlled by two sets of simultaneously operated valves 115 and 116. The discharge pipes from the accumulators are connected to the single upflow pipe 46 and the pipe 66 for the downflow is connected to the storage reservoir 107.

The valve construction and the leads are substantially as follows having reference particularly to Figs. 3 and 4: The up pipe 46 is connected to a bridge pipe 120 and the down pipe 66 is connected to a bridge pipe 121. A section of Fig. 4 illustrates the connection of the upflow fluid to the cylinders at the lower valves and the connection to the downflow at the upper valves. The bridging pipes are connected by cored castings 122 having passages 123 connecting from the bridge pipe 120 to the two sets of cylinders and passage 124 from the bridge pipe 121 also to the two sets of cylinders.

In Fig. 4 is illustrated a vertical section through one of the valves, the lower valve showing the infeeding connection and the upper valve the outfeeding connection. The valve structure is provided with valve seats 125 which have poppet valves 126 seating thereon, these valves having stems 127 mounted in suitable guideways 128 and 129 and actuated by cams 130 on a cam shaft 131. Springs 132 engage the upper portion of the valves and a closure plug 133 having a socket 134. By this arrangement, it will be seen that the valves are closed by spring pressure and are opened by the cams.

An infeeding duct 135 is indicated at the bottom of Fig. 4; this leads through the valve opening 136 and into a port 137. Therefore, presuming that this valve is positioned for intake with the piston in the adjacent cylinder moving upwardly, the hydraulic fluid has an outflow through the port 138 at the top through the valve opening 139 into the duct 140, which leads to the inner core 124 leading to the shorter bridge pipe 121 which is connected to the down pipe 66. Therefore the amount of opening of the exhaust valve is regulated by the cam and not by the internal pressure in the cylinder.

The cam shaft 131 is driven from the crank shaft 21 by means of a large gear 145 mounted on the crank shaft meshing with a large gear 146 journaled on an idler shaft 147. A beveled gear 148 rotating with the gear 146 drives a beveled gear 149 mounted on a longitudinal shaft 150 journaled in cross braces 151 and 152 (Fig. 3). The shaft 150 has a beveled pinion 153.

This pinion 153 operates with a differential type of mechanism illustrated particularly in Fig. 6. In this illustration the cam shaft is indicated by 131 and has a bushing 154 rotatable thereon, which bushing carries a cage structure 155 having a gear 156 meshing with the gear 153. This cage is provided with a plurality of radial shafts 157 having pinions 158 rotatably mounted thereon. These pinions mesh on one side with a gear 159 on an elongated sleeve 160 mounted on the bushing 154 and on the opposite side mesh with a gear 161 on the sleeve 162 secured to the shaft 131 by a key 163 or the like.

A reversing mechanism is provided by a drum 164 secured to the sleeve 160 by a key 165. This drum has cable grooves 166 with cables 167 operating therein, the ends of the cable being secured to the drum. A ring 168 is mounted on the sleeve 160 for a limited movement having an arcuate slot 169 allowing a limited movement of the key 165 in such slot. A lug 170 extends laterally from the bridge pipe 121 and has a pawl 171 mounted on a pivot 172 thereon. This pawl has a substantial tooth 173. This tooth is adapted to engage in two notches 174 and 175 on the ring 168. The drum 164 has notches with an inclined surface 176 engaging a lateral extension 177 of the tooth of the pawl 171. This pawl is under tension of a spring 178 secured to a suitable structure, such as the cored casting 122. (Note Figs. 6, 7 and 12.)

The manner of operation of the differential type of cam shaft action and control is substantially as follows: Presuming the device is in the position illustrated in Figs. 7 and 12. The cage 155 is rotated by the beveled pinion 153 and, as the ring 168 and drum 164 are held stationary by engagement with the tooth 175 of the pawl 171, the pinions 158 are given a rotary movement which communicates rotation to the sleeve 162 through the medium of the gear 161 and transmits the rotary motion to the cam shaft 131 through the key 163. Therefore the cams operate on the valve stems, actuating the poppet valves. This may be considered to govern the operation of the engine and rotation of the crank shaft for one direction of movement.

The engines are preferably arranged so that the connecting rods connect to cranks at 90 degrees to each other or at a suitable angle to avoid a dead center position; then if it is desired to reverse the engine, one of the cables 167 is pulled and in this case the cable on the left hand side would be pulled, such action causes a slipping motion between the ring 168 and the drum 164 to the limit of the slot 169, in which the key 165 operates, causing the extension 177 of the tooth 173 of the pawl to ride on the inclined surface 176, thereby freeing the tooth of the pawl from the notch 175. The rotation of the drum is then continued until the tooth of the pawl engages with the opposite notch 174, which action, it will be seen, causes a transmission of relative motion through the pinions 158, the sleeve 162 to the cam shaft and shifts the position of the cams to a different position from that formerly occupied, and this causes a reverse operation of the engines, causing the crank shaft to rotate in an opposite direction. The cams are constructed so that they operate on the poppet valves in opposite directions of rotation.

In some cases I wish to enlarge the sprocket gears 24 from the small size to a large size, and this is arranged as shown in Fig. 8 by utilizing large half sprockets 180 and 181 secured together by clamp bolts 182. In making this connection the sprocket chains are lifted and supported in any suitable manner while the large sprocket gears may be attached or removed. On handling extremely heavy weights it is preferable to use the small sprockets, and on comparatively light weights, the large sprockets are utilized so as to increase the speed of movement of the sprocket chains or to give the same speed with the lower engine operation.

I preferably use two accumulators in the hydraulic system for high and low pressure; the low pressure accumulator is used when great speed is desired in raising and lowering drill pipe when the weight is not too great. However, when a large number of stands have been joined together and the weight becomes too great for the low pressure accumulator, then a switch-over is made to the high pressure accumulator. This latter may also be used for setting casing when the weight becomes great.

From the above description, together with the drawings, it will be seen that I have developed a comprehensive crown hoist with associated mechanism. The valve control layout indicated in Figs. 9, 10 and 11 is, as shown in the diagrams of Figs. 1 and 14, mounted adjacent the floor of the derrick convenient for handling by the driller. My appliance, it will be seen, can be readily handled and operated to give a quick action in lowering and raising the different stands of pipe or casing to build up a string or to disconnect same and is especially valuable in the drilling operation by maintaining substantially the maximum torque which it is safe to carry on a drill pipe and the connections, and causing the rate of downward feed of the drill bit to correspond with this torque, thereby working the drilling equipment to substantially its maximum capacity.

The switch 83 indicates in diagram a connection by which any suitable electrical instrument such as indicated in 81 may be electrically coupled with an electric motor used to rotate the drill pipes, such as the motor used to operate the rotary table. The instrument 81 therefore operates in accordance with the varying current required to rotate the drill pipe and manifestly such current changes during difficult and easy drilling.

The rack 80 may be connected to the electrical instrument in any suitable manner so that it may be reciprocated by such instrument and thereby operate the valve 73; the characteristic being that increases and decreases in the amount of power utilized to rotate the drill pipe will cause a shifting of the rack to decrease or increase the opening of the by-pass valve 73.

The electrical instrument may operate the rack 80 through the medium of for instance, a solenoid urging the rack in one direction with a spring mechanism for retracting the rack or with the solenoids acting somewhat opposed one to the other. Or of desired, the rack may be connected to a rotating element in an electrical instrument by a gear or a lever connection.

An important feature of my invention is that the hydraulic fluid in the discharge or down pipe from the engine is controlled by the torque on the bit so that substantially a constant pressure is maintained in this discharge pipe. The valves in this discharge pipe are so controlled that there is a continuous and progressive lowering of the drill pipe and bit without any upward lift except, of course, should the bit become stuck and the torque become so great as to completely shut off the valves or the discharge from the engine. The engine is operated in a reverse direction to lower the drill string entirely by the weight of the drill string actuating the engine in reverse. The up or supply pipe and its valve only function in this lowering to maintain the engine supplied with hydraulic fluid but this fluid need not be under any positive pressure except to maintain the cylinders full of hydraulic fluid.

Various changes may be made in the principles of my invention without departing from the spirit thereof, as set forth in the description, drawings and claims.

I claim:

1. A crown hoist comprising in combination a hydraulic engine, a source of hydraulic fluid supply under pressure, an up pipe from the supply to the engine, a down pipe from the engine, each of said pipes having a through connection and a by-pass, shut-off valves controlling the through connection and the by-pass, and means to interlink the valve in the through connection and by-pass in at least one of the pipes to operate said valves in unison whereby when the through valve is opened, the by-pass valve is closed, and vice versa.

2. A crown hoist, as claimed in claim 1, there being through and by-pass valves in both the up and down pipes, each of said sets of valves being connected to operate simultaneously whereby opening the through valve closes the by-pass valve in the same up and down pipes, means to interconnect both operating means for the up and down pipes to operate simultaneously in opposite directions, and means operated by the engine to support a drill pipe.

3. A crown hoist comprising in combination a hydraulic engine, a source of hydraulic fluid supply under pressure, an up pipe to the engine and a down pipe from the engine, each of said pipes having a through connection and a by-pass, the through connections having main valves and the by-pass having auxiliary valves, means to interlink the main and auxiliary valves of the up and down pipes to operate simultaneously in opposite directions whereby on opening of a main valve a by-pass valve is closed, means controlled by the torque developed in drilling to control at least one of the by-pass valves in at least one of the pipes, and means actuated by the engine to move a drill pipe.

4. A crown hoist, as claimed in claim 3, the means to control the main and auxiliary valves on the up and down pipes having an interlinking mechanism, said interlinking mechanism being connected to actuate the valves in both pipes simultaneously.

5. A crown hoist comprising in combination a hydraulic engine, a source of hydraulic fluid supply under pressure, an up and down pipe to and from said engine, one of said pipes having a control valve, means actuated by the torque developed in drilling to control said valve, said valve being closable when the torque becomes excessive, means to lock said valve closed and give a signal of said valve being closed, and means actuated by the engine to move a drill pipe.

6. A crown hoist, as claimed in claim 5, the pipe having the valve controlled by the torque having such valve in the by-pass with a through connection having a main valve, and an auxiliary valve in the by-pass, said main and auxiliary valves being interconnected simultaneously in opposite directions.

7. A crown hoist comprising in combination a hydraulic engine, a source of hydraulic power under pressure, an up and a down pipe between the source of power and the engine, each pipe having a through connection and a by-pass, each through connection having a main valve, each by-pass having a pair of auxiliary valves, a pair of auxiliary valves and the main valve of one of the pipes being inter-linked to operate simultaneously in opposite directions, one of the auxiliary valves and the main valve of the other pipe being connected to operate simultaneously in opposite directions, and means actuated by the engine to move a drill pipe.

8. A crown hoist, as claimed in claim 7, one of the by-pass valves in one of the pipes having an interlinking connection with a torque-actuated device, said torque being developed in a drilling operation whereby said valve is controlled by the changing torque in drilling and thereby governs the engine.

9. In a crown hoist, a supporting structure having an opening, a cylinder mounted thereon having a neck extending through said opening with a thread on the lower end of the neck, a piston rod extending through said neck, a nut threaded on the neck and having a worm gear, a thrust structure between the nut and the supporting structure, and a worm shaft having a worm meshing with the worm gear.

10. A crown hoist for drilling, comprising in combination a derrick having an engine, a drill pipe, electrical means to rotate said pipe, means operated by the said engine to lift, lower and support the drill pipe, piping having valves from the supply to the engine, an electric relay type of device connected to the electrical rotary drive to control at least one of said valves in accordance with the torque on the drill pipe developed in drilling.

11. In a device as described, the combination of a well derrick, a drill pipe having a drill bit, a hydraulic engine in the derrick, means operated by said engine to lower the drill pipe and to regulate the pressure of the drill bit on the formation of the well, means to control the flow of the hydraulic fluid to and from the engine, an electric responsive control operated by the torque on the drill pipe to actuate the control means for the hydraulic fluid and thereby regulate the rate of lowering the drill bit in accordance with the torque developed.

12. A device as described comprising, in combination, a well derrick having a hydraulically operated reciprocating engine mounted on the top of the derrick, a crank shaft rotated by said engine, such shaft being mounted at the top of the derrick, a sprocket wheel on said crank shaft having a sprocket chain operating thereover, means to guide one end of the chain in the axial center of the derrick, and means to guide the other end of the chain away from such center, said chain being adapted for connection to drill pipe or the like, said engine having an up and a down pipe connected thereto and extending from the top of the derrick to the bottom thereof, and a fluid control means at the bottom of the derrick having a through connection and a by-pass shut-off valve in each pipe, and means to interlink the valves to regulate the flow of the hydraulic fluid.

13. A crown hoist comprising, in combination, a derrick having a hydraulic engine, means to supply hydraulic fluid under pressure to such engine with supply piping having valves leading from the supply means to the engine, discharge piping from the engine having valves, a drill pipe, a connection therefrom to the engine to raise and lower the pipe, means to rotate said pipe, electrical means governed by the torque on the drill pipe, and a control from said electrical means to at least one of the valves in the discharge piping to control the degree of opening of such valve and hence the discharge of fluid from the hydraulic engine, and thereby regulate the downward speed of the drill pipe in accordance with the torque required to rotate such pipe.

14. In a device for rotary drilling, the combination of a string of drill pipe, a driving means for rotating the pipe, a fluid operated supporting and feeding means for the drill pipe, an electrical means responsive to the torque developed in operating the rotating means, and a control means operated by the relay means to control the operation of the fluid operated suspending means and thereby cause changes in the rate of downward feed of the drill pipe.

15. A crown hoist comprising, in combination, a hydraulic engine, a source of hydraulic supply under pressure, pipes from the supply to the engine and return, at least one of said pipes having control valves, a string of drill pipe, means to rotate said string, an electrical relay means responsive to the torque developed in rotating the string, a flexible suspending means operated by the engine for raising the string or the weight of the string causing the operation of the engine in lowering the string, and means to control said valves operated by the electrical relay means to control the engine and regulate the rate of lowering of the string in relation to the torque developed in rotating the string.

16. In a device for rotary drilling, the combination of a well derrick, a hydraulic engine mounted on the top thereof, a shaft driven by said engine also at the top of the derrick, a flexible suspending means engaging said shaft, a string of drill pipe connected to the suspending means, means to rotate the pipe, piping connections to supply the engine, and discharge piping from the engine for the hydraulic fluid, and means controlled by the torque developed in rotating the pipe to control the flow through the discharge pipe and thereby regulate the operation of the engine and the rate of continuous and progressive lowering of the drill string without an upward movement of said string.

17. In a device for rotary drilling, the combination of a well derrick, a hydraulic engine mounted on the top thereof, a rotary shaft at the top of the derrick operated by the engine, a flexible chain extending over the shaft and having both ends depending, one end being substantially central of the derrick and having a string of drill pipe connected thereto, means to rotate the pipe, supply and discharge pipes for the engine, the discharge pipe having a valve, and means responsive to the torque developed in rotating the pipe to control said valve and regulate the flow of hydraulic fluid through the engine and thereby regulate the rate of continuous and progressive lowering of the drill string without an upward movement of said string.

18. In a device for rotary drilling as claimed in claim 17, a manual means to control said valve, and a manual means to control the operation of the engine to raise the drill string, the weight of the drill string being adapted to operate the engine in a reverse direction for lowering of the string, said pipe having the valve also having a by-pass with a secondary valve, the torque responsive means being adapted to close the primary and open the secondary valve or vice versa.

19. In a drilling appliance, a well derrick, a shaft mounted to rotate in opposite directions at the top of said derrick, a flexible member supported by the shaft and having both ends depending, one end being substantially central of the derrick and having a drill string connected thereto, means to rotate said string, means to rotate the shaft in one direction to raise the string and in the other direction to lower the string, a control means for controlling the direction of rotation of said shaft, a power means to rotate the shaft for elevating the drill string and to act as a retarding means during the lowering of the drill string, means for manually regulating the rotation of the shaft to govern the rate of downward movement of the string, and means controlled by the torque required to rotate the drill pipe and operatively connected to the retarding means for the shaft to regulate the continuous and progressive downward movement of the string without an upward lift of the string independently of the manual means.

20. In a device for rotary drilling, the combination of a well derrick, a hydraulic engine mounted on the top thereof, a rotary shaft at the top of the derrick operated by the engine, a flexible chain extending over the shaft and having both ends depending, one end being substantially central of the derrick and having a string of drill pipe connected thereto, means to rotate the string, supply and discharge pipes for the engine, a valve in one of such pipes, electrical means responsive to the torque developed in rotating the string, and means to operate the valve actuated by the electrical responsive means, said valve controlling the engine and regulating the rate of lowering of the drill string.

21. In a drilling appliance, a well derrick, a hydraulic engine mounted on the top thereof, a rotary shaft at the top of the derrick and operated by the engine, a flexible chain extending over the shaft with both ends depending, one end being substantially central of the derrick having a drill string connected thereto, means to rotate the string, supply and discharge pipes for the engine, the discharge pipe having a by-pass and having a manually controlled main and secondary valve, the main valve being in the discharge pipe and the secondary valve in the by-pass, and means to differentially operate said valves to open one and close the other and vice versa, a third valve in the by-pass, an electrical means responsive to the torque required to rotate the string, and means operated thereby to operate the third valve and control the flow of the hydraulic fluid from the engine, such flow thereby controlling the weight of the lowering of the string.

22. A device as described comprising, in combination, a well derrick, a hydraulic engine mounted on the top of said derrick, a supply connection for fluid for the engine, a discharge connection from the engine, a control valve in the discharge connection, a string of drill pipe, a hoisting and lowering means operated by the engine for raising and lowering the pipe, means to rotate the pipe, and a control means for the valve in the discharge actuated in accordance with the torque on the drill pipe developed in drilling to regulate said valve, the weight of the drill string being adapted to actuate the engine, said valve being adapted to maintain substantially constant pressure in the discharge connection when actuated by the torque responsive means whereby the speed of lowering of the drill string may be regulated in accordance with the torque, the lowering, however, being continuous and progressive without an upward lift on the pipe.

23. A device as described comprising, in combination, a well derrick, a hydraulic engine, a string of drill pipe, a flexible suspension means for the drill string operated by the engine, a fluid connection to supply the engine having a manually controlled valve, a discharge fluid connection having an automatically controlled valve, means to rotate the drill string, means responsive to the torque developed in rotating the string and forming the automatic means for actuating the valve in the discharge connection, the weight of the drill string in being lowered being adapted to operate the engine and develop a pressure in the discharge connection, the torque control of the valve in the discharge connection maintaining an uninterrupted lowering of the drill string at various speeds dependent on the torque without an uplift being exerted on the string.

24. A device as described comprising, in combination, a well derrick, a hydraulic engine, a string of drill pipe, a flexible suspension means for the drill string connected to the engine, electrical means for rotating the drill string, an electric type of relay actuated in accordance with the torque, a supply connection to the engine having a manual control, a discharge connection having a valve, such valve being controlled by the torque responsive relay, the weight of the drill string in being lowered being adapted to actuate the engine and to develop a hydraulic pressure in the discharge connection, the flow of the discharge fluid being regulated by the valve to maintain an uninterrupted continuous lowering of the drill string at various speeds dependent on the torque without an upward lift of the drill string.

25. In the method of drilling, suspending a drill pipe in a well by means of a hydraulic engine, causing the weight of the pipe to operate the engine and to cause a discharge of hydraulic fluid from the engine, rotating the pipe, operating an electrical relay in accordance with the torque developed in rotating the pipe, controlling the pressure of the discharge fluid by means of the electrical relay and thereby maintaining an uninterrupted continuous descent of the drill pipe without lifting at various speeds in accordance with the resistance to the rotation of the pipe in drilling.

26. In the method of drilling, suspending a drill pipe in a well by means of a hydraulic engine, causing the weight of the pipe to operate the engine and to cause a discharge of hydraulic fluid from the engine, rotating the pipe by electrical means, causing the electric current required to rotate the pipe to regulate discharge of fluid of the engine to maintain an uninterrupted continuous descent of the drill pipe without lifting at various speeds by maintaining a substantially constant pressure in the discharge of the engine.

27. In the method of drilling, suspending a drill pipe in a well by means of a hydraulic engine, causing the weight of the pipe to operate the engine and to cause a discharge of hydraulic fluid from the engine, rotating the pipe by an electrical motor, operating an electrical relay in accordance with the varying current used to actuate the motor, controlling the pressure of the discharged fluid by means of the electrical relay to maintain a substantially constant pressure of such discharge and thereby maintaining an uninterrupted continuous descent of the drill pipe without lifting at various speeds.

28. In the method of drilling, suspending a drill pipe in a well by a flexible suspending means actuated by a hydraulic engine, causing the weight of the pipe to operate the engine and to cause a discharge of hydraulic fluid from the engine, rotating the pipe by an electrical motor, operating an electrical relay in accordance with the variations in the electric current used to operate the motor, controlling the pressure of the discharge fluid by means of the electrical relay to maintain a substantially constant pressure in the engine and thereby maintaining an uninterrupted continuous descent of the drill pipe without lifting at various speeds.

29. In a device for rotary drilling, the combination of a well derrick, a hydraulic engine, a flexible suspending means actuated by said engine, a string of drill pipe connected to the suspending means, electrical means to rotate the pipe, hydraulic piping connections to supply the engine and discharge piping from the engine, means controlled by electric current used to actuate the means in rotating the pipe to control the flow through the discharge pipe and thereby regulate the operation of the engine and the rate of continuous and progressive lowering of the drill string without an upward lift on any part of said string.

30. In a device for rotary drilling, the combination of a well derrick, a hydraulic engine, a rotary shaft at the top of the derrick operated by the engine, a flexible chain extending over the shaft, a string of drill pipe connected thereto to be raised, lowered, and suspended by the flexible means, an electrical motor to rotate the pipe, supply and discharge pipes for the engine, the discharge pipe having a valve, and means responsive to the electric current used to operate the motor in rotating the pipe to control said valve and regulate the flow of hydraulic fluid from the engine and thereby regulate the rate of continuous and progressive lowering of the drill string without an upward movement on any part of said string.

31. In a device for rotary well drilling, a rotary load-lifting, lowering or sustaining means, means to suspend a string of drill pipe from the raising, lowering, and sustaining means, a hydraulic engine, a manual control means for the engine for regulating the raising, lowering, or sustaining means, an electric power load-rotating means, and means for governing the downward speed of the load controlling the hydraulic engine in accordance with the varying electric current required to rotate said load while drilling.

32. A hydraulic power means for lifting, lowering or sustaining a load, a manual control for actuating said power means to raise, lower or sustain a string of drill pipe forming a load suspended from the power means, electric power operated means for rotating the string of drill pipe, means for governing the power means to regulate the downward speed of the drill string by controlling the discharge from said hydraulic power means in accordance with the electric current required to rotate said drill string while drilling.

33. A device as described comprising, in combination, a well derrick having a hydraulically operated reciprocating engine mounted on the top of the derrick, a crank shaft rotated by said engine, such shaft being mounted at the top of the derrick, a sprocket wheel on said crank shaft having a sprocket chain operating thereover, means to guide one end of the chain in the axial center of the derrick, and means to guide the other end of the chain away from such center, said chain being adapted for connection to drill pipe or the like, a remote control means to control the flow of hydraulic fluid to and from said engine, said control means having an up pipe leading from a source of supply to the engine and a down pipe from the engine, each of said pipes having a through connection shut-off valve and a by-pass shut-off valve, and means to interlink the valve in the through connection and the by-pass valve in at least one of the pipes to operate said valves in unison whereby when the through valve is open the by-pass valve is closed and vice versa.

34. A device as described comprising, in combination, a well derrick having a hydraulically operated engine, a shaft at the top of the derrick having a sprocket wheel, means to rotate said shaft by the engine, a sprocket chain operating over said shaft, one end of the chain depending in the center of the derrick, means to guide the other end of the chain away from the center, the center chain being adapted for connection to a drill pipe or the like, said engine having a feed and a discharge pipe, a fluid control means having a through connection and a by-pass shut-off valve in each pipe, and means to interlink the valves to regulate the flow of hydraulic fluid.

35. A device as described comprising, in combination, a well derrick having a hydraulically operated engine, a shaft at the top of the derrick having a sprocket wheel, means to rotate said shaft by the engine, a sprocket chain operating over said shaft, one end of the chain depending in the center of the derrick, means to guide the other end of the chain away from the center, the center chain being adapted for connection to a drill pipe or the like, a remote control means having a feed pipe and a discharge pipe, each of said pipes having a through connection shut-off valve and a by-pass shut-off valve, and means to interlink the valve in the through connection and by-pass in at least one of the pipes to operate said valves in unison whereby when the through valve is open the by-pass valve is closed and vice versa.

LEWIS E. ZERBE.